United States Patent
Conley

(10) Patent No.: US 6,540,456 B2
(45) Date of Patent: Apr. 1, 2003

(54) METHOD AND APPARATUS FOR CUTTING LOW DENSITY FLEXIBLE MATERIAL USING A ROTARY CUTTING TOOL

(76) Inventor: James A. Conley, 14020 N. 99th Dr., Sun City, AZ (US) 85351-2354

( * ) Notice: Subject to any disclaimer, the term of this patent is extended or adjusted under 35 U.S.C. 154(b) by 43 days.

(21) Appl. No.: 09/728,836

(22) Filed: Nov. 30, 2000

(65) Prior Publication Data

US 2001/0033782 A1 Oct. 25, 2001

Related U.S. Application Data

(60) Provisional application No. 60/168,520, filed on Dec. 2, 1999.

(51) Int. Cl.⁷ ................................. B23C 3/00
(52) U.S. Cl. .......................... 409/132; 408/67; 408/97; 409/137; 409/190
(58) Field of Search .............................. 408/95, 97, 67, 408/19; 409/131, 132, 137, 190, 191; 269/21

(56) References Cited

U.S. PATENT DOCUMENTS

| | | | |
|---|---|---|---|
| 1,868,932 A | | 7/1932 | Wernet |
| 3,192,801 A | * | 7/1965 | Gingras ..................... 144/93.1 |
| 3,344,697 A | | 10/1967 | Schneider ..................... 83/19 |
| 3,863,530 A | * | 2/1975 | Weidman ..................... 409/304 |
| 3,935,352 A | | 1/1976 | Toland ......................... 428/95 |
| 3,940,522 A | | 2/1976 | Wessells ....................... 428/17 |
| 3,942,411 A | * | 3/1976 | Gerber ......................... 409/137 |
| 4,007,307 A | | 2/1977 | Friedrich ..................... 428/17 |
| 4,244,669 A | * | 1/1981 | Puritz et al. ............. 144/136.1 |
| 4,382,728 A | * | 5/1983 | Anderson et al. ........ 144/135.2 |
| 4,426,415 A | | 1/1984 | Avery ........................... 428/17 |
| 4,663,100 A | | 5/1987 | Mioche ....................... 264/158 |
| 4,682,523 A | | 7/1987 | Johnson et al. ............... 83/19 |
| 4,749,314 A | * | 6/1988 | LeBlond ..................... 408/130 |
| 4,792,657 A | | 12/1988 | Conley .................. 219/121.39 |
| 4,822,219 A | * | 4/1989 | Wood et al. ............. 144/252.1 |
| 4,880,958 A | | 11/1989 | Conley .................. 219/121.58 |
| 5,044,235 A | | 9/1991 | Lehner ......................... 83/13 |
| 5,129,295 A | | 7/1992 | Geffros et al. ................. 83/19 |
| 5,144,873 A | | 9/1992 | Nasu ............................. 83/19 |
| 5,174,180 A | | 12/1992 | Stevens ......................... 83/19 |
| 5,208,440 A | | 5/1993 | Conley .................. 219/121.44 |
| 5,317,943 A | * | 6/1994 | Dowdle ....................... 409/132 |
| 5,460,067 A | | 10/1995 | Reis et al. ...................... 83/19 |
| 5,601,886 A | | 2/1997 | Ishikawa et al. ............. 428/17 |
| 5,882,155 A | * | 3/1999 | Testa, Jr. ................ 144/136.95 |

* cited by examiner

Primary Examiner—Daniel W. Howell
(74) Attorney, Agent, or Firm—Wayne L. Lovercheck

(57) ABSTRACT

Apparatus and method for cutting a low density flexible material and passing through a semi-rigid base material simultaneously by means of a rotary milling cutter and simultaneously applying a compressive force to the flexible material to increase the rigidity of the flexible material while cutting the flexible material, the method includes passing the cutter through a part of the semi-rigid material. The compression force is applied by a partial cylindrical shaped compression head having the rotary milling cutter extending therethrough.

19 Claims, 5 Drawing Sheets

METHOD AND APPARATUS FOR CUTTING LOW DENSITY FLEXIBLE MATERIAL USING A ROTARY CUTTING TOOL

CROSS REFERENCE TO RELATED APPLICATIONS

This application claims the benefit of U.S. Provisional Application Ser. No. 60/168,520 filed Dec. 2, 1999.

STATEMENT REGARDING FEDERALLY SPONSORED RESEARCH OR DEVELOPMENT

Not applicable

BACKGROUND OF THE INVENTION

This invention relates generally to a method and apparatus for cutting through low-density flexible material such as non-rigid FIBERGLAS duct-liner insulation by pre-compressing the material using a rotary cutting milling tool to cut the material and supporting the material on a semi-rigid base that allows the milling tool to pass through it with minimal damage to the base. The fiber mass of FIBERGLAS material can be easily compressed and upon release returns to its original fiber mass shape.

Applicant is aware of the following U.S. Pat. Nos. 4,880,958; 4,792,657; 5,044,235; 5,208,440; and, 5,460,067. None of the above patents relate to pre-compression of a flexible material and cutting it with a rotary cutting tool.

BRIEF SUMMARY OF THE INVENTION

The invention incorporates a spherical density conversion head to compress the flexible fiber material to convert it to a higher density.

The problems of cutting low-density non-rigid material such as FIBERGLAS insulation by use of a spherical density conversion head and a rotary cutting milling tool are not solved by the prior art. An apparatus and method is disclosed herein for cutting sheets of non-rigid fiber material such as FIBERGLAS duct-liner insulation for air conditioning and the like is carried out by converting the non-rigid fiber material to a semi-rigid material through compression, prior to cutting. According to the preferred embodiment of the invention, sheets of a low density semi-rigid artificial turf material, such as shown in U.S. Pat. Nos. 3,935,352; 3,940,522; 4,007,307; 4,426,415; and 5,601,886, are placed on a table of a milling machine and a sheet of, or sheets of a low density flexible fiber material are placed on the low density semi-rigid artificial turf material. The sheets of low-density flexible fiber material are then compressed to a semi-rigid state in the region where they are to be cut or milled.

The downward pressure of the machine compresses the flexible fiber FIBERGLAS duct liner insulation to a semi-rigid and non-tangled state and the semi-rigid materials may be cut or milled simultaneously when pressing the material.

It is an object of the present invention to provide an improved method of simultaneously cutting flexible low-density fiber FIBERGLAS duct-liner insulation by converting the low density fiber material to a semi-rigid state and cutting the material by means of a rotary milling tool.

It is another object of the present invention to compress a fibrous or flexible fiber material and cut the compressed material by means of a rotary cutter.

It is another object of the present invention to provide an improved process of cutting flexible fiber materials by compressing the material and simultaneously cutting the material by means of a rotary cutter in combination with a vacuum system for waste material collection.

It is another object of the present invention to provide an improved machine for cutting flexible fiber materials.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
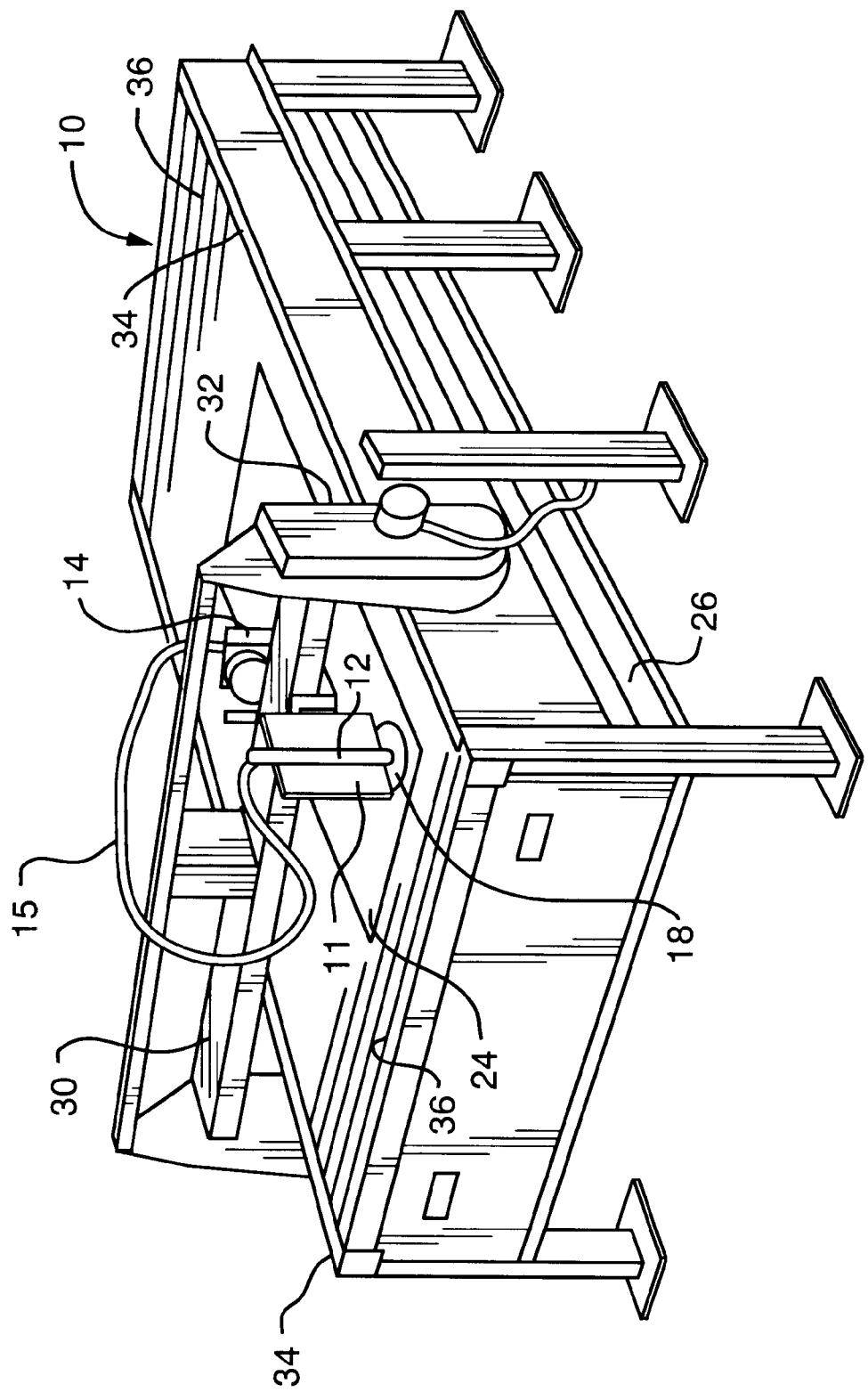
FIG. 1 is an isometric view of a machine that may be used for the pressing, milling and cutting of flexible fiber material according to the invention.
Figure 2:
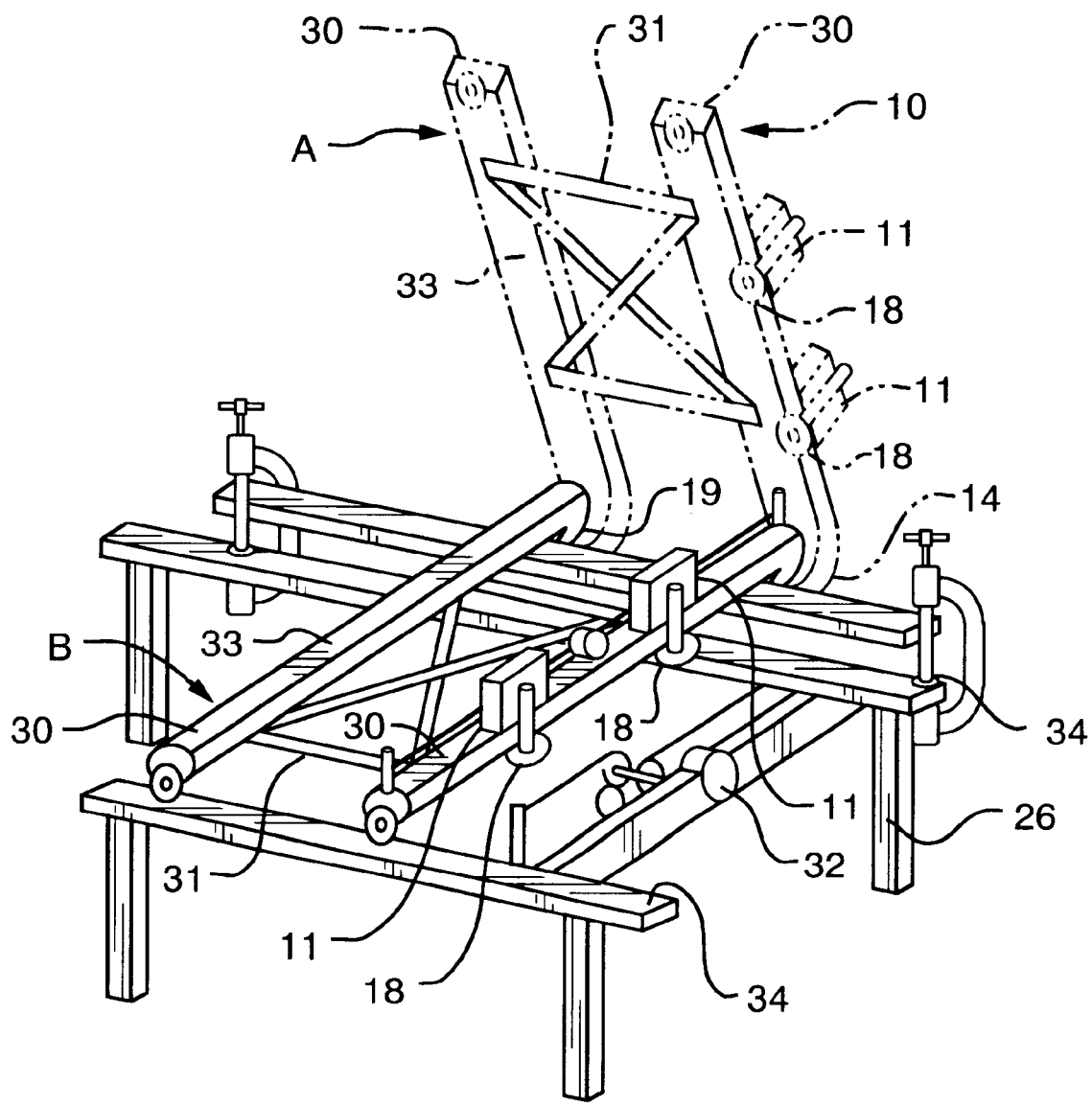
FIG. 2 is an isometric view of a machine that may be used for the pressing, milling and cutting of flexible fiber material with the use of multiple cutting heads mounted on a raiseable hinged gantry.
Figure 3:
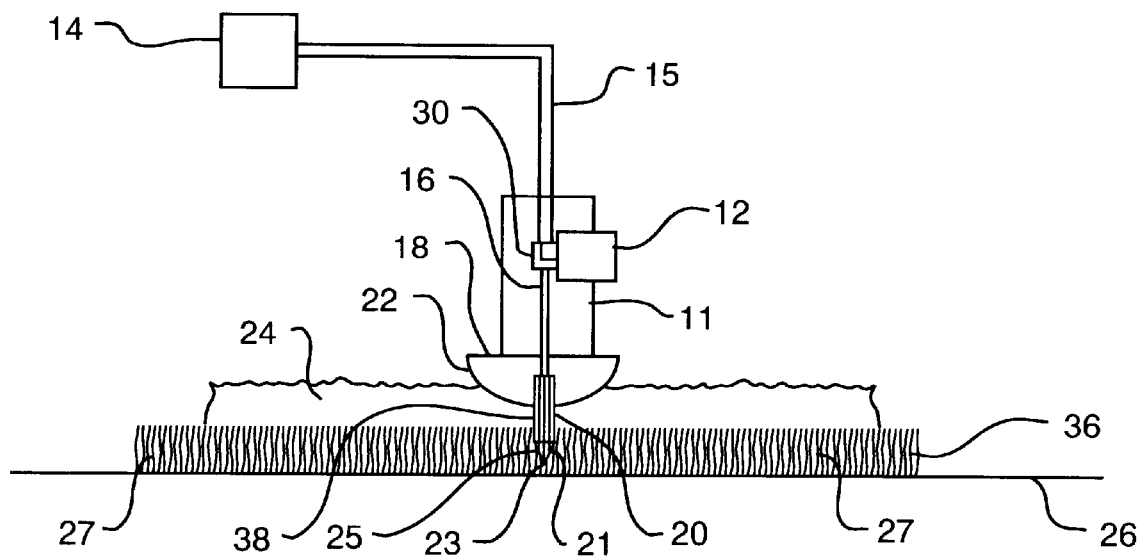
FIG. 3 is an enlarged view of the density conversion head and the rotary milling machine with the drive motor and controller.
Figure 4:
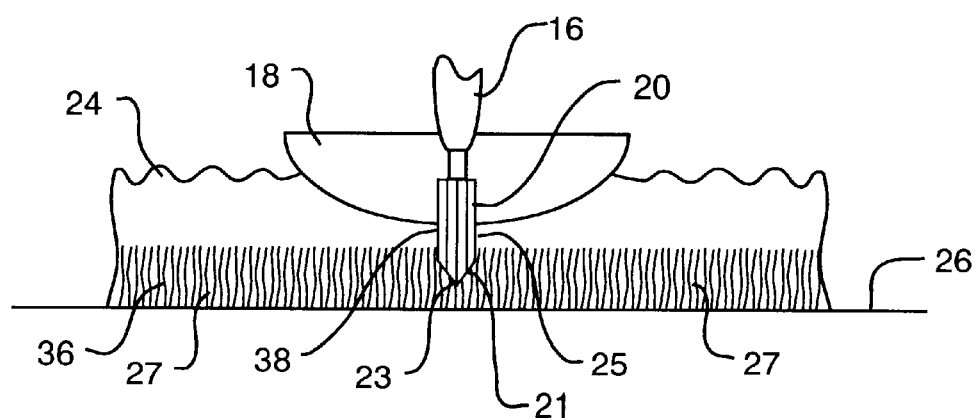
FIG. 4 is an enlarged partial side view of a rotary milling cutter in combination with a spherical density conversion head according to the invention.

The preferred embodiment of the invention is illustrated by way of example in FIGS. 1 and 2 which show machine 10 for simultaneously cutting low density flexible fiber FIBERGLAS duct-liner insulation 24 and passing through low density semi-rigid material 36. Low density semi-rigid material 36 may be artificial turf-type material of the type shown in U.S. Pat. No. 4,007,307. The cutting is done by rotary mill head 11, which holds cylindrical rotary machine cutter 20 driven by motor 12 through shaft 16. Motor 12 is connected by cable 15 to power source 14. Cylindrical rotary milling machine cutter 20 has cutting teeth 21 that extend outwardly on outer diameter 25 and come to a sharp point 23. Conversion head 18 is mounted to rotary mill head 11. Conversion head 18 has partial spherical surface 22 having a center of curvature on the axis of rotation of rotary milling machine cutter 20. One or more rotary milling heads 11 are supported on one or more lateral tracks 30.

FIG. 2 shows a machine having two lateral tracks 30 joined by cross members 31 forming a raise and lower able gantry 33 which is shown in both the raised position A for convenient placement of materials and lowered position B ready for operation of rotary milling heads 11. Gantry 33 has hinges 19 mounted at one end of each lateral track 30. Lateral track 30 has driving means 32 for movement of rotary milling heads 11, on which is mounted conversion head 18. Lateral track 30 either as a single track or as a unit of two forming gantry 33 can be moved longitudinally on tracks 34 mounted to table 26.

Conversion head 18 engages fiber insulation 24 and compresses it to form a thin semi-rigid region 38 of insulation material 24 that is engaged by rotary milling machine cutter 20 so that the fibers of insulation 24 will be held in place and will be cut by rotary milling machine cutter 20 as the rotary milling head or heads travel along lateral track 30 or gantry 33 which in turn can travel along longitudinal track 34.

The preferred embodiment of the invention is illustrated by way of example in FIGS. 3 through 7 which show machine cutter 20, which is rotated by shaft 16 attached to motor 12 which is mounted on rotary mill head 11, whose cutting teeth 21 and sharp point 23 simultaneously cut low density flexible fiber FIBERGLAS duct liner insulation 24 in the thin semi-rigid region 38 and pass through low density semi-rigid material 36, mounted on table 26, whose turf blades 27 support fiber insulation 24 while it is being pressed on by spherical conversion head 18 having a partial spherical lower surface 22. Teeth 21 on milling cutter 20 will deflect turf blades 27 and pass between them doing very little or no cutting or milling damage to them. Vacuum ports 17 in partial spherical surface 22 on conversion head 18, will allow movement of air through the interior formed by conversion head lid 28 when vacuum hose connection 29 is attached to a vacuum cleaner or other air movement device. This airflow will pick up and carry away waste material 35 produced by the cutting action of rotary cutter teeth 21 as they pass through the thin semi rigid section of insulation 24.

Figure 5:
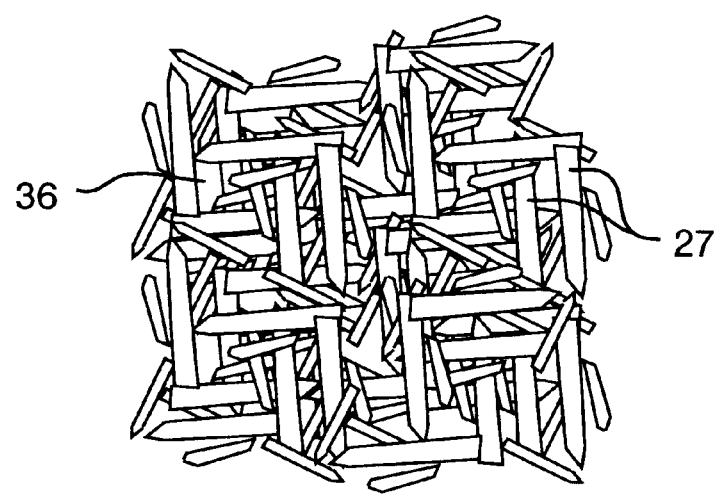
FIG. 5 is an isometric view of the semi-rigid material of the artificial turf.
Figure 6:
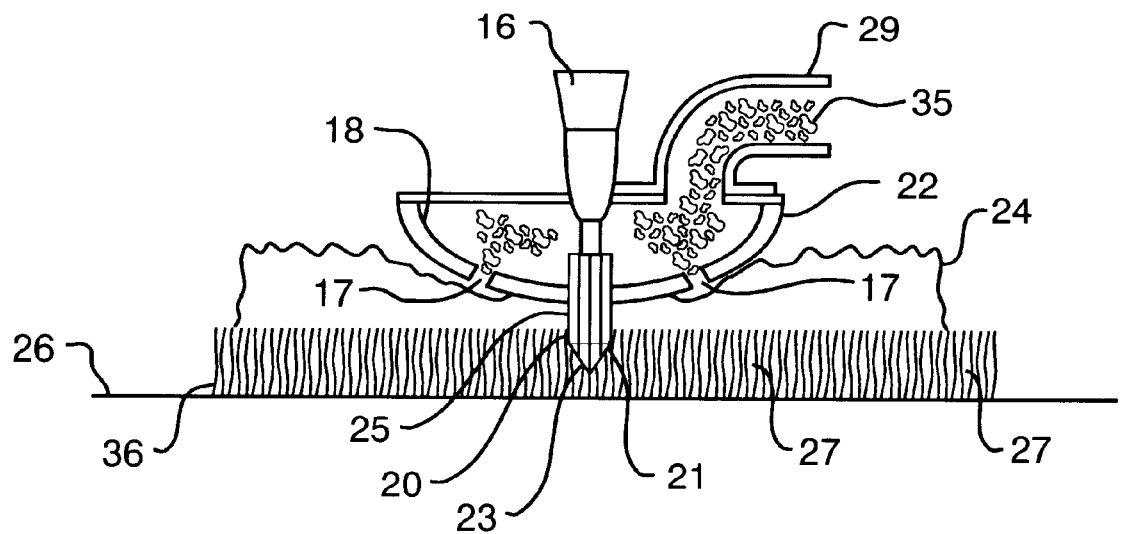
FIG. 6 is an enlarged cross sectional view of the combination rotary milling tool and a perforated spherical density conversion head adapted to compress the flexible material, in combination with a hose connection to apply a vacuum to collect waste material during the cutting operation in accordance with the invention.
Figure 7:
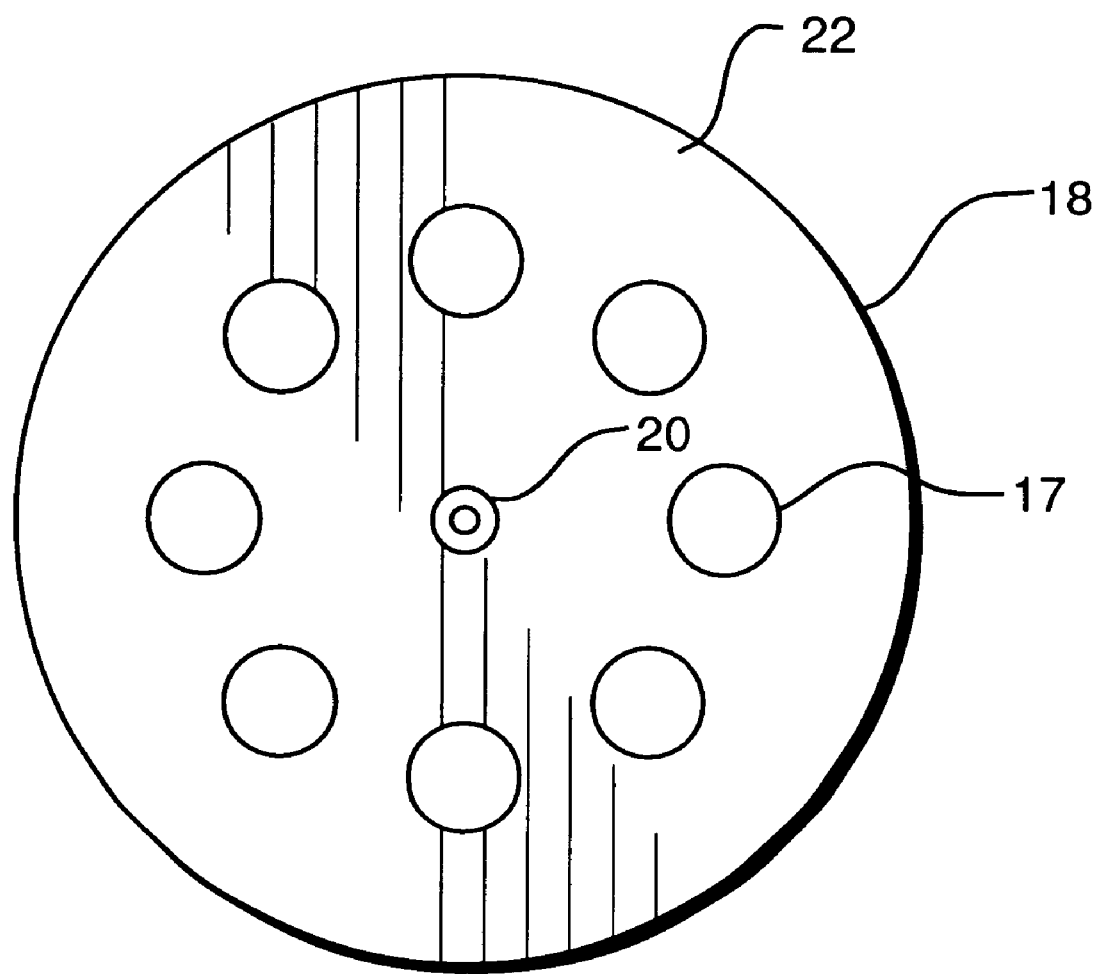
FIG. 7 is a bottom view of the perforated spherical density conversion head.

In the method of the invention low density flexible fiber duct liner insulation 24 is placed on top of a low density semi-rigid material, such as artificial turf 36 as shown in FIG. 5, having grass like fibers or blades 27 that extend laterally, longitudinally and vertically at random, which move aside as rotary milling machine cutter 20 moves through the turf without cutting a substantial amount of the blades or fiber and protecting table 26 on which the semi-rigid material 36 is placed. Thus, low-density flexible fiber duct liner insulation 24 is cut and may be removed from the system. Low-density semi-rigid material 36 may bet removed or allowed to remain on table 26. A new sheet of low density flexible fiber duct liner insulation 24 may be loaded on top of low density semi-rigid material 36 and cut as previously described.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of cutting a low-density flexible material having the characteristics of FIBERGLAS insulation having fibers comprising the steps of:
   supporting said flexible fiber material on a semi-rigid base;
   compressing said flexible fiber material to substantially a rigid state prior to cutting; and,
   cutting said compressed flexible fiber material with a rotary cutter that passes through said compressed flexible fiber material and at least a portion of said semi-rigid base simultaneously.

2. The method of claim 1 comprising the further step of providing a rotary milling cutter having an axis of rotation generally perpendicular to said sheet.

3. The method of claim 1 further comprising the further step of providing a conversion head having a surface concentric to said axis of rotation of said cutter.

4. The method of claim 3 further providing said conversion head with the shape of a section of a sphere.

5. The method of claim 4 further providing a lid on the top of and vacuum ports in the lower portion of, said section of a sphere, through which airflow is induced to remove waste material produced by said cutter.

6. A machine for cutting sheets of low-density FIBERGLAS material;
   said machine having two laterally spaced tracks;
   said lateral tracks having end means supported on spaced longitudinal tracks;
   a partial spherical conversion head and a rotating milling cutter supported on said axis of said conversion head movably mounted on said lateral tracks and a first moving means connected to said conversion head;
   a second moving means connected to said lateral tracks to move said lateral tracks along said longitudinal tracks; and,
   said cutter being adapted to cut said low-density FIBERGLAS material when said cutter is moved relative to said low-density fiberglas material.

7. The method of claim 1 further providing said semi-rigid base material as an artificial turf-like material.

8. The method of claim 7 further providing upwardly extending blades on said artificial turf-like material, said blades extending upward to support said flexible material.

9. The method of claim 7 further providing upwardly and laterally extending spaced grass-like fibers to support said flexible material.

10. The method of claim 9 further providing spacing said grass-like fibers from one another.

11. The method of claim 9 further providing randomly inclining some of said grass-like fibers laterally and longitudinally to support said flexible fiber material.

12. The machine recited in claim 6 wherein said lateral tracks are fixed to said machine and said lateral track longitudinal ends are movably supported on said longitudinal tracks;
   a first motor means on said conversation head for moving along said lateral tracks laterally relative to said machine thereby cutting said material laterally; and,
   a milling cutter being adapted to move with said lateral tracks thereby cutting said material longitudinally.

13. The machine recited in claim 12 wherein said lateral track has end means attached thereto supporting said lateral tracks on said longitudinal tracks.

14. The machine recited in claim 13 wherein a second motor means is a gear motor having an output shaft connected to said milling cutter.

15. The machine recited in claim 14 therein said FIBERGLAS material is supported on a table.

16. The machine recited in claim 15 wherein said conversion head is adapted to channel an airflow to remove waste material during said milling cutter operation.

17. The machine recited in claim 16 wherein said lateral track has multiple conversion heads and milling cutters movably mounted there upon.

18. The machine recited in claim 17 wherein said longitudinal tracks have multiple lateral tracks with said attached end means being supported on said longitudinal tracks.

19. The machine recited in claim 18 wherein said multiple lateral tracks have a cross brace attached there between forming a gantry; and,
   said gantry being hinged to swing upwards by hinge means attached at one end of said lateral tracks.

* * * * *